J. W. EVANS.
METHOD AND APPARATUS FOR CLEANSING ARTICLES OF REFUSE TINWARE AND FOR THE RECOVERY OF SOLDER THEREFROM.
APPLICATION FILED NOV. 25, 1908.
935,477.
Patented Sept. 28, 1909.
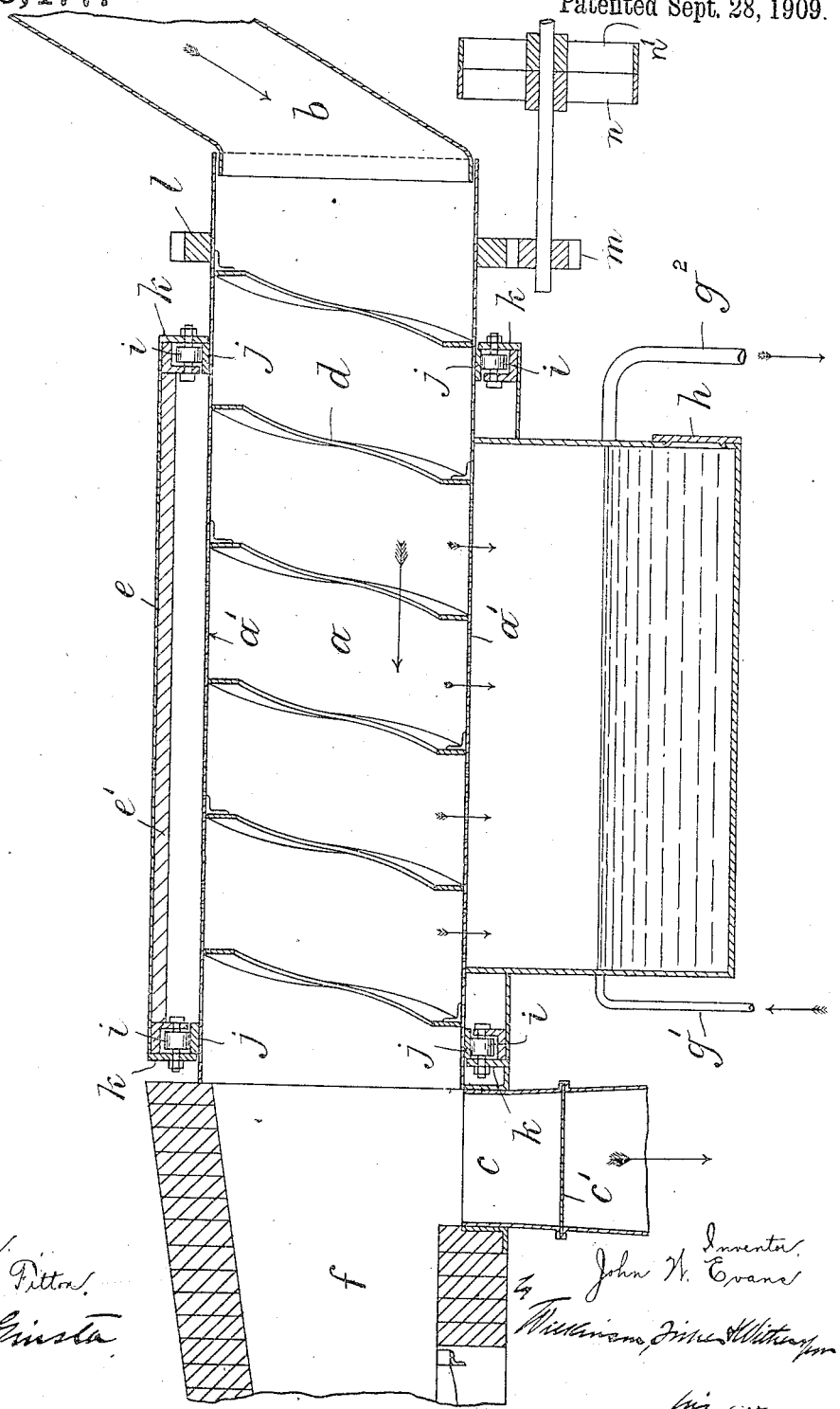

UNITED STATES PATENT OFFICE.

JOHN WILLIAM EVANS, OF CARGO FLEET, MIDDLESBROUGH, ENGLAND.

METHOD AND APPARATUS FOR CLEANSING ARTICLES OF REFUSE TINWARE AND FOR THE RECOVERY OF SOLDER THEREFROM.

935,477.     Specification of Letters Patent.     Patented Sept. 28, 1909.

Application filed November 25, 1908. Serial No. 464,477.

*To all whom it may concern:*

Be it known that I, JOHN WILLIAM EVANS, of the Iron & Steel Foundry, Cargo Fleet, Middlesbrough, a subject of the King of Great Britain and Ireland, residing at Cargo Fleet, Middlesbrough, England, have invented certain new and useful Improvements in the Method of and Apparatus for Cleansing Articles of Refuse Tinware and for the Recovery of Solder Therefrom; and I do hereby declare the following to be a full, clear, and exact description of the invention, such as will enable others skilled in the art to which it appertains to make and use the same.

This invention relates to the method of and apparatus for the treatment of refuse tin ware, by which the thin steel plate of which such articles are made is stripped of the coating of solder and other adhering material, and so rendered fit for forming into blocks or ingots of refined iron to be used for making special small castings, which could not otherwise be done with the solder and other material adhering thereto; the solder being subsequently recovered free from dirt or oxid of iron and therefore fit for further service for the purposes to which solder is applied.

Having thus indicated the nature and utility of my invention, in order that it may be clearly understood and readily carried into effect, I will proceed to describe the same, and for that purpose shall refer to the drawing annexed to this specification, which illustrates in longitudinal sectional elevation a convenient form of apparatus for the purposes of my invention.

Such an apparatus consists as follows:—A revolving cylindrical chamber $a$ occupying an approximately horizontal position is furnished with a hopper $b$ at one end, a chute $c$ at the other end, and a spiral blade or worm $d$ inside; these parts being so adapted to each other in their relative positions and capacities that the refuse articles of tin ware charged into the hopper $b$ are conveyed by the spiral blade or worm $d$ through the cylindrical chamber $a$ to the chute $c$ where they accumulate and from which they are discharged from time to time by withdrawing the slide $c'$, to be received into wagons, trucks or otherwise disposed of as suitable material for re-melting purposes. The cylindrical chamber $a$ is inclosed within an outer chamber $e$ and communicates therewith by perforations $a'$, the outer chamber being lined with firebrick $e'$ to retain the heat in the inner chamber. Heated gases rich in carbon so as to be free from oxygen supplied from a furnace $f$ arranged for the purpose are passed into the inner chamber raising its temperature to a dull red heat, or the temperature at which the solder adhering to the tin ware will melt sufficiently to be separated therefrom. The worm $d$ is adapted by the angle of its spiral or blade to subject the tin ware to a continual tumbling about, and this in conjunction with the heat and presence of carbon separates the solder, dirt and oxid of iron from the steel plate of which the articles under treatment are made. The mixture of solder, dirt and oxid of iron is received through the perforations $a'$ in the cylinder bottom into a water bosh or tank $g$ below, which water bosh is furnished with inflow and outflow pipes $g'$ $g^2$ respectively, by which the surface of the water is kept in a constant flow to wash away the dirt, leaving the heavier materials to fall to the bottom of the water bosh where they constitute a mixture of solder and oxid of iron in a finely divided state. This is raked out from time to time through an opening or sludge hole $h$, and after drying by the application of heat is subjected to magnetism in any convenient form of apparatus by which the oxid of iron is retained, while the particles of solder are passed on and collected for use.

Between the inner and outer chambers are provided rollers $i$ at each end which bear against surface rings $j$ fixed on the inner chamber, the ends of the outer chamber being inclosed by the rings $k$. The cylinder $a$ is driven by suitable gearing such as a circular rack $l$ into which gears a pinion $m$ driven by fast and loose pulleys $n$ $n'$ from any suitable engine or motor. The spiral blade $d$ which may be perforated is pitched at an angle found suitable for the purpose, say a 2 to 1 ratio between the diameter and pitch of the spiral.

I am aware that it has been proposed to use rotating horizontal cylinders, closed in at both ends, into or through which heated non-oxidizing gases are passed, and provided with perforated walls for the escape of the solder, in processes for treating articles of refuse tin ware for the removal and recovery of the solder, by means of a continuous feeding of the articles and the continuous separation of the solder, such apparatus being provided with agitators for assisting in the more complete separation of the materials by means of hot gases. I therefore make no claim to the general principle involved in the treatment of refuse tin ware in the manner already known, but in my invention the tin ware is continuously passed through a cylindrical chamber open at both ends and rotating in an approximately horizontal position, the said chamber being heated by products of combustion received from a furnace and rich in carbon so as to be substantially free from oxygen. Likewise in my apparatus this chamber is furnished with a spiral blade or worm by which the articles under treatment are prevented from clogging by being tumbled about as they are driven forward to a discharging chute after being stripped of solder and other adhering material which has been dislodged by mechanical agitation aided by the heated products of combustion. This solder and other material so detached passes through perforations in the cylinder shell directly into a tank of water for treatment by washing and after removal for drying by the application of heat is finally subjected to magnetism for the elimination of the oxid of iron from the solder; it being understood that the treatment of the solder and oxid mixture may not always form part of the detinning process.

Having thus described my invention, what I claim and desire to secure by Letters Patent of the United States is:—

1. The process of treating refuse tin ware, which consists in continuously feeding the same to a rotating chamber; in continuously forcing into said chamber products of combustion at a temperature sufficient to melt solder, rich in carbon and substantially free from oxygen; in continuously causing said ware to be tumbled about in said chamber so as to mechanically dislodge the melted solder and other material adhering thereto; in permitting said dislodged solder and other material to pass out of said chamber into a suitable vessel containing water by which the solder and oxid of iron is separated from the lighter material; in removing said solder and iron oxid from said vessel; drying the same; and finally subjecting the same to the action of magnetism, substantially as described.

2. In an apparatus for recovering the metal in refuse tin ware, the combination of a perforated chamber open at both ends; means for continuously rotating the same; means for continuously feeding tin ware to said chamber; a spiral blade in said chamber for causing the tin ware to be continuously agitated; a channel through which heated gases rich in carbon and poor in oxygen may be fed to said chamber; an outer casing for said chamber; and a water tank below the same provided with an opening through which solder and sludge may be withdrawn, substantially as described.

In testimony whereof, I affix my signature, in presence of two witnesses.

JOHN WILLIAM EVANS.

Witnesses:
  HENRY P. ATKINSON,
  THOMAS CRAIG.